United States Patent [19]

Schroter

[11] Patent No.: US 6,338,133 B1
[45] Date of Patent: Jan. 8, 2002

[54] MEASURED, ALLOCATION OF SPECULATIVE BRANCH INSTRUCTIONS TO PROCESSOR EXECUTION UNITS

[75] Inventor: David Andrew Schroter, Round Rock, TX (US)

[73] Assignee: International Business Machines Corporation, Armonk, NY (US)

[*] Notice: Subject to any disclaimer, the term of this patent is extended or adjusted under 35 U.S.C. 154(b) by 0 days.

[21] Appl. No.: 09/267,200

[22] Filed: Mar. 12, 1999

[51] Int. Cl.[7] .......................... G06F 9/38; G06F 9/445; G06F 9/312; G06F 9/24
[52] U.S. Cl. ....................... 712/214; 712/206; 712/207; 712/239; 712/237; 712/245; 711/137; 711/144; 711/145; 711/123; 711/125; 710/54; 710/56; 710/57
[58] Field of Search .......................... 712/231, 232, 712/233, 234, 236, 237, 239, 207, 206, 216, 222, 245, 202, 228, 23, 215, 223, 235, 126, 217, 204, 226, 214; 711/137, 144, 145; 710/54, 56, 57

[56] References Cited

U.S. PATENT DOCUMENTS

| 5,228,131 A | | 7/1993 | Ueda et al. ................. 712/240 |
| 5,333,283 A | | 7/1994 | Emma et al. ............... 712/236 |
| 5,421,020 A | | 5/1995 | Levitan ....................... 712/237 |
| 5,454,117 A | | 9/1995 | Puziol et al. ................ 712/23 |
| 5,463,745 A | * | 10/1995 | Vidwans et al. ............ 712/218 |
| 5,564,111 A | | 10/1996 | Glew et al. ................... 174/53 |
| 5,611,063 A | | 3/1997 | Loper et al. ................ 712/205 |
| 5,613,083 A | | 3/1997 | Glew et al. ................. 711/207 |
| 5,613,125 A | | 3/1997 | Nguyen et al. ................ 713/1 |
| 5,625,787 A | | 4/1997 | Mahin et al. ............... 712/204 |
| 5,634,103 A | | 5/1997 | Dietz et al. ................. 712/235 |
| 5,640,526 A | | 6/1997 | Mahin et al. ............... 712/207 |
| 5,644,744 A | | 7/1997 | Mahin et al. ............... 712/207 |
| 5,664,136 A | | 9/1997 | Witt et al. .................. 712/208 |
| 5,724,565 A | | 3/1998 | Dubey et al. ............... 712/245 |
| 5,729,728 A | | 3/1998 | Colwell et al. ............. 712/234 |
| 5,752,014 A | | 5/1998 | Mallick et al. ............. 712/240 |
| 5,778,245 A | * | 7/1998 | Papworth et al. ............. 712/23 |
| 6,009,499 A | * | 12/1999 | Koppala ....................... 711/132 |

FOREIGN PATENT DOCUMENTS

EP     0751458 A1    1/1997

OTHER PUBLICATIONS

IBM Technical Disclosure Bulletin, "Cycle Steal at Rename Register," vol. 38, No. 9, Sep. 1995, pp. 363–364.

IBM Technical Disclosure Bulletin, "Data Restoration of an Addressable Array," vol. 35, No. 1A, Jun. 1992, pp. 222–225.

Pradeep K. Dubey et al., "Single–Program Speculative Multithreading (SPSM) Architecture: Compiler–Assisted Fine Grained Multithreading", Conference on Parallel Architectures and Compilation Techniques, 1995, pp. 102–121.

Rainer Mueller, "The MC88110 Instruction Sequencer", Northcon Conference Record, Oct. 19–21, 1992, pp. 198–201.

* cited by examiner

Primary Examiner—Daniel H. Pan
(74) Attorney, Agent, or Firm—Leslie A. Van Leeuwen; Bracewell & Patterson, L.L.P.

(57) ABSTRACT

A method and system for branch dispatching of instructions in a data processor. A processor having one or more buffers for storing instructions and one or more execution units for executing instructions is utilized. Each unit has a corresponding queue which holds instructions pending execution. First, a threshold level (selected maximum number of instructions in the instruction queue) is set. The current utilization measure for one or more execution units in the data processing system is determined. The current utilization measure is compared to the predetermined threshold value; and a speculative branch instruction is dispatched to a selected execution unit when the current utilization measure is less than the predetermined threshold value.

12 Claims, 5 Drawing Sheets

MEASURED, ALLOCATION OF SPECULATIVE BRANCH INSTRUCTIONS TO PROCESSOR EXECUTION UNITS

BACKGROUND OF THE INVENTION

1. Technical Field

The present invention relates in general to a method and system for data processing and in particular to a method and system for executing instructions within a data processor. Still more particularly, the present invention relates to a method and system for executing instructions within a data processor such that speculative branch instructions are controlled to provide more efficient execution.

2. Description of the Related Art

A conventional high performance superscalar processor typically includes an instruction cache for storing instructions, an instruction buffer for temporarily storing instructions fetched from the instruction cache for execution, a number of execution units for executing sequential instructions, a branch processing unit (BPU) for executing branch instructions, a dispatch unit for dispatching sequential instructions from the instruction buffer to particular execution units, and a completion buffer for temporarily storing instructions that have finished execution, but have not been completed.

As is well known in the art, sequential instructions fetched from the instruction queue are stored within the instruction buffer pending dispatch to the execution units. In contrast, branch instructions fetched from the instruction cache are typically forwarded directly to the branch processing unit for execution. In some cases, the condition register value upon which a conditional branch depends can be ascertained prior to executing the branch instruction, that is, the branch can be resolved prior to execution. If a branch is resolved prior to execution, instructions at the target address of the branch instruction are fetched and executed by the processor. In addition, any sequential instructions following the branch that have been pre-fetched are discarded. However, the outcome of a branch instruction often cannot be determined prior to executing the branch instruction due to a condition register dependency. When a branch instruction remains unresolved at execution, the branch processing unit utilizes a prediction mechanism, such as a branch history table, to predict which execution path should be taken. In conventional processors, the dispatch of sequential instructions following a branch predicted as taken is halted and instructions within the speculative target instruction stream are fetched during the next processor cycle. If the branch that was predicted as taken is resolved as mispredicted, a mispredict penalty is incurred by the processor due to the cycle time required to restore the sequential execution stream following the branch instructions.

A high performance processor achieves high instruction throughput by fetching and dispatching instructions under the assumption that branches are correctly predicted and allows instructions to execute without waiting for the completion of previous instructions. This is commonly known as speculative execution, i.e., executing instructions that may or may not have to be executed. The CPU guesses which path the branch was going to take. This guess may be a very intelligent guess (as in a branch history table) or very simple (as in always guess path not taken). Once the guess is made, the CPU starts executing that path. Typically, the processor executes instructions speculatively when it has resources that would otherwise be idle, so that the operation may be done at minimum or no cost. Therefore, in order to enhance performance, some processors speculatively execute unresolved branch instructions by predicting whether or not the indicated branch will be taken. Utilizing the result of the prediction, the fetcher is then able to fetch instructions within the speculative execution path prior to the resolution of the branch, thereby avoiding a stall in the execution pipeline if the branch is resolved as correctly predicted. If the guess is correct, and there are no holes or delays in the pipeline, execution continues at full speed. If, however, subsequent events indicate that the speculative instruction should not have been executed, the processor has to abandon any result that the speculative instruction produced and begin executing the path that should have been taken. The processor "flushes" or throws away the instruction results, backs itself up to get a new address and executes the correct instruction.

Most operations can be performed speculatively, as long as the processor appears to follow a simple sequential method such as those in a scalar processor. For some applications, however, speculative operations can be a severe detriment to the performance of the processor. For example, in the case of executing a load instruction after a branch instruction (known as speculative load because the load instruction is executed speculatively without knowing exactly which path of the branch would be taken), if the predicted execution path is incorrect, there is a high delay penalty is incurred when the pending speculative load in the instruction stream requests the required data from the system bus. In many applications, the rate of mis-predicted branches is high enough that the cost of speculatively accessing the system bus is prohibitively expensive. Furthermore, essential data stored in a data cache may be displaced by some irrelevant data obtained from the system bus because of a wrongful execution of a speculative load instruction caused by misprediction.

Prior art handling of this speculative execution of instructions includes U.S. Pat. No. 5,454,117 which discloses a branch prediction hardware mechanism. The mechanism performs speculative execution based on the branch history information in a table. However, it does not provide a means for prediction based on the current status of the branch execution unit. Similarly, U.S. Pat. No. 5,611,063 discloses a method for tracking allocation of resources within a processor utilizing a resource counter which has two bits set in two possible states corresponding to whether or not the instruction is speculative or when dispatched to an execution unit respectively.

U.S. Pat. No. 5,752,014 discloses a selection from among a plurality of branch prediction methodologies, namely dynamic prediction and static prediction, in speculative execution of conditional branch instructions. It discusses the execution of the instructions based on the prediction and subsequent conditional branch instruction.

No prior art discloses a method or system for determining whether to dispatch a speculative instruction based on current loading conditions. Consequently, a processor and method for speculatively executing conditional branch instructions are needed which intelligently determines when it is necessary to utilize speculative prediction.

In modern microprocessors, there are many mechanisms known to speculatively execute instructions. Speculative execution can improve performance significantly if the speculation is correct. In speculatively executing branch instructions, prediction means improve the likelihood of guessing the correct path. However, if the guess is wrong recovery means must be utilized to cancel the effect of instructions that should not be completed. In actual practice, it is sometimes difficult and expensive to selectively cancel instructions as a result of a bad branch speculation. This is especially true in superscalar systems where instructions are executed out-of-order. A new method is needed to better determine when speculative branch instructions are to be dispatched.

It would therefore be desirable to provide a method and system for selectively executing speculative branch instructions in a high performance processor by utilizing a better prediction scheme. It is further desirable to provide a method and system which dispatch speculative instructions only when the system is below a predefined load capacity to prevent unfettered dispatching of speculative instructions.

SUMMARY OF THE INVENTION

It is therefore one object of the present invention to provide an improved data processor.

It is another object of the present invention to provide a method and system for executing instructions within a data processor.

It is yet another object of the present invention to provide a method and system for executing instructions within a data processor such that speculative branch instructions are controlled to provide more efficient execution.

The foregoing objects are achieved as is now described. A method and system is disclosed for speculative branch dispatching of instructions in a data processor. A processor having one or more buffers for storing instructions and one or more execution units for executing instructions is utilized. Each execution unit has a corresponding queue which holds instructions pending execution. First, a threshold level (selected maximum number of instructions in the instruction queue) is set. The current utilization measure for one or more execution units in the data processing system is then determined. The current utilization measure is compared to the predetermined threshold value; and a speculative branch instruction is dispatched to a selected execution unit when the current utilization measure is less than the predetermined threshold value.

In one embodiment of the invention, the branch dispatching check occurs at each unit individually. A comparison is made of the number of instructions queued to the execution unit with its threshold value. The dispatching step dispatches the branch instructions to that execution unit only when the number of instructions queued at the execution unit is lower than the threshold value for that unit.

The above as well as additional objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
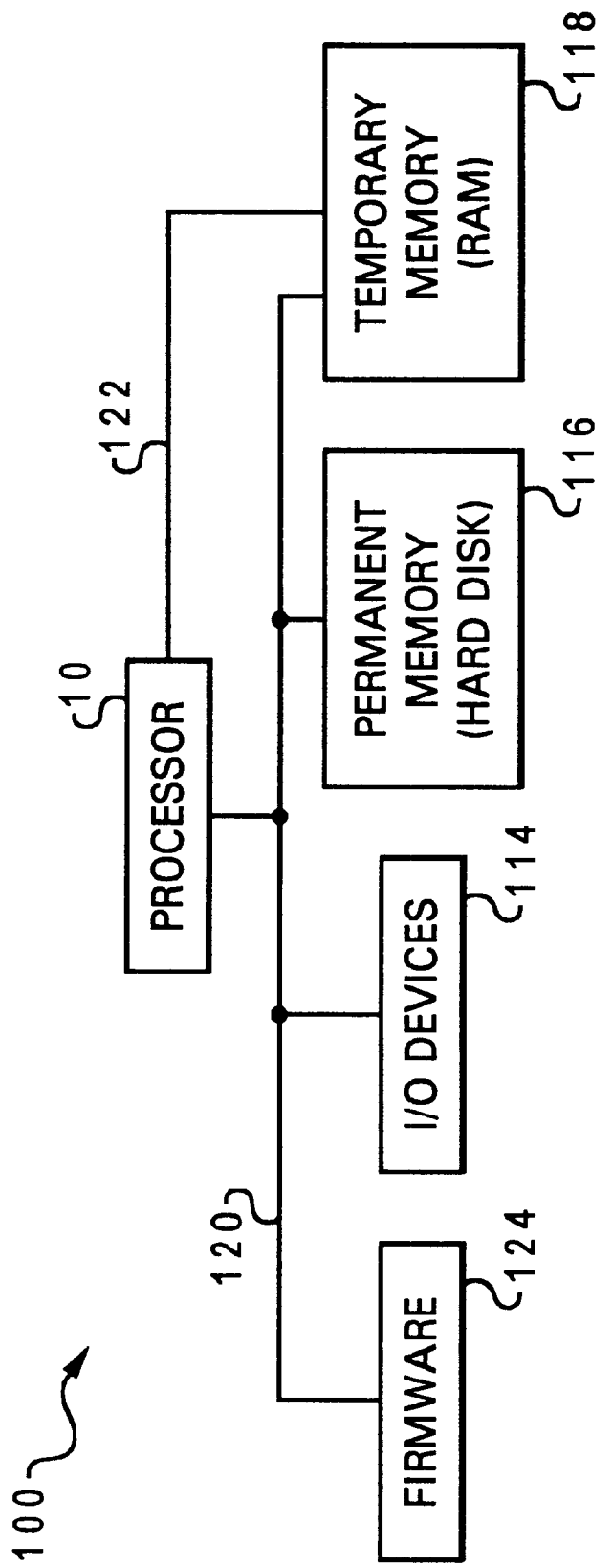
FIG. 1 is a block diagram of a data processing system utilized in one embodiment of the present invention.

With reference now to the figures and in particular with reference to FIG. 1, there is illustrated a block diagram of the basic structure of a data processing system 100 utilized in the preferred embodiment of the invention. Data processing system 100 has at least one central processing unit (CPU) or processor 10 which is connected to several peripheral devices, including input/output devices 114 (such as a display monitor, keyboard, and graphical pointing device) for user interface, a permanent memory device 116 (such as a hard disk) for storing the data processing system's operating system and user programs/applications, and a temporary memory device 118 (such as random access memory or RAM) that is utilized by processor 10 to implement program instructions. Processor 10 communicates with the peripheral devices by various means, including a bus 120 or a direct channel 122 (more than one bus may be provided utilizing a bus bridge).

Those skilled in the art will further appreciate that there are other components that might be utilized in conjunction with those shown in the block diagram of FIG. 1; for example, a display adapter connected to processor 10 might be utilized to control a video display monitor, and a memory controller may be utilized as an interface between temporary memory device 118 and processor 10. Data processing system 100 also includes firmware 124 whose primary purpose is to seek out and load an operating system from one of the peripherals (usually permanent memory device 116) whenever the data processing system is first turned on. In the preferred embodiment, data processing system contains a relatively fast CPU or processor 10 along with sufficient temporary memory device 118 and space on permanent memory device 116, and other required hardware components necessary for providing efficient execution of instructions.

Figure 2:
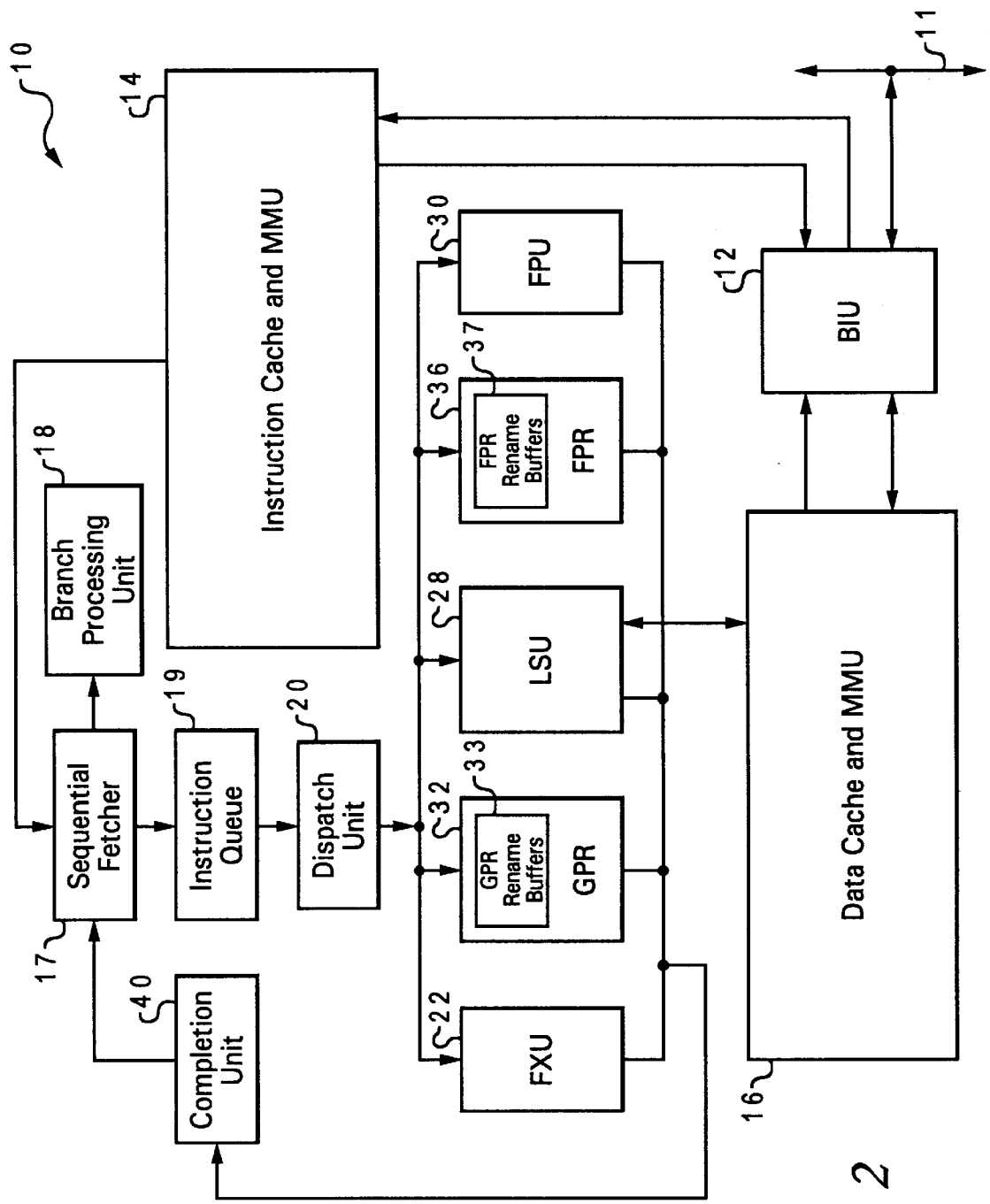
FIG. 2 is a block diagram of a preferred embodiment of a processor which utilizes the method and system of the present invention.

FIG. 2 is a block diagram of processor 10, for processing information according to a preferred embodiment of the present invention. Processor 10 may be located within data processing system 100 as depicted in FIG. 1. In the depicted embodiment, processor 10 comprises a single integrated circuit superscalar microprocessor. Accordingly, as discussed further below, processor 10 includes various execution units, registers, buffers, memories, and other functional units, which are all formed by integrated circuitry. In a preferred embodiment of the present invention, processor 10 comprises one of the PowerPc™ line of microprocessors, which operates according to reduced instruction set computing (RISC) techniques. As depicted in FIG. 1, processor 10 is coupled to system bus 11 via a bus interface unit BIU 12 within processor 10. BIU 12 controls the transfer of information between processor 10 and other devices coupled to system bus 11 such as a main memory (not illustrated). Processor 10, system bus 11, and the other devices coupled to system bus 11 together form a data processing system.

BIU 12 is connected to instruction cache 14 and data cache 16 within processor 10. High speech caches, such as instruction cache 14 and data cache 16, enable processor 10 to achieve relatively fast access time to a subset of data or instructions previously transferred from main memory to instruction cache 14 and data cache 16, thus improving the speech of operation of the data processing system. Instruction cache 14 is further coupled to sequential fetcher 17, which fetches instructions from instruction cache 14 during each cycle for execution. Sequential fetcher 17 transmits branch instructions fetched from instruction cache 14 to branch processing unit BPU 18 for execution, but stores sequential instructions within instruction queue 19 for execution by other execution circuitry within processor 10.

In the depicted embodiment, in addition to BPU 18, the execution circuitry of processor 10 comprises multiple execution units, including fixed-point unit (FXU) 22, load/store unit (LSU) 28, and floating-point unit (FPU) 30. As is well known by those skilled in the art, each of execution units FXU 22, LSU 28, and FPU 30 executes one or more instructions within a particular class of sequential instructions during each processor cycle. For example, FXU 22 performs fixed-point mathematical operations such as addition, subtraction, ANDing, ORing, and XORing utilizing source operands received from specified general purpose registers (GPRs) 32. Following the execution of a fixed point instruction, FXU 22 outputs the data results of the instruction to GPR rename buffers 33, which provide temporary storage for the result data until the instruction is completed by transferring the result data from GPR rename buffers 33 to one or more of GPRs 32. Conversely, FPU 30 performs floating-point operations, such as floating-point multiplication and division, on source operands received from floating-point registers FPRs 36. FPU 30 outputs data resulting from the execution of floating-point instructions to selected FPR rename buffers 37, which temporarily store the result data until the instructions are completed by transferring the result data from FPR rename buffers 37 to selected FPRs 36. As its name implies, LSU 28 executes floating-point and fixed-point instructions which either load data from memory (i.e., either data cache 16 or main memory) into selected GPRs 32 or FPRs 36 or which store data from a selected GPRs 32 or FPRs 36 to memory.

Processor 10 employs both pipelining and out-of-order execution of instructions to further improve the performance of its superscalar architecture. Accordingly, instructions can by executed by FXU 22, LSU 28, and FPU 30 in any order as long as data dependencies are observed. In addition, instructions are processed by each of FXU 22, LSU 28 and FPU 30 at a sequence of pipeline stages. As is typical of high performance processors, each instruction is processed at five distinct pipeline stages, namely, fetch, decode/dispatch, execute, finish and completion.

During the fetch stage, sequential fetcher 17 retrieves one or more instructions associated with one or more memory addresses from instruction cache 14. Sequential instructions fetched from instruction cache 14 are stored by sequential fetcher 17 within registers such as instruction queue 19. In contrast, sequential fetcher 17 removes branch instructions from the instruction stream and forwards them to BPU 18 for execution. BPU 18 includes a branch prediction mechanism, which in one embodiment comprises a dynamic prediction mechanism such as a branch history table, that enables BPU 18 to speculatively execute unresolved conditional branch instructions by predicting whether the branch will be taken. Alternatively, in other embodiments of the present invention, a static, compiler-based prediction mechanism is implemented. As will be described in greater detail below, the present invention minimizes branch misprediction and subsequent penalties incurred by processor 10 when speculative instruction branch prediction is desired.

During the decode/dispatch stage, dispatch unit 20 decodes and dispatches one or more instructions from instruction queue 19 to the appropriate ones of execution units FXU 22, LSU 28 and FPU 30. Decoding involves determining the type of instruction including its characteristics and the execution unit to which it should be dispatched. In the preferred embodiment, it also involves determining whether or not the instruction is speculative. Also during the decode/dispatch stage, dispatch unit 20 allocates a rename buffer within GPR rename buffers 33 or FPR rename buffers 37 for each dispatched instructions' result data. According to a preferred embodiment of the present invention, dispatch unit 20 is connected to execution units FXU 22, LSU 28 and FPU 30 by a set of registers described below with reference to FIGS. 4A and 4B.

Figure 4A:
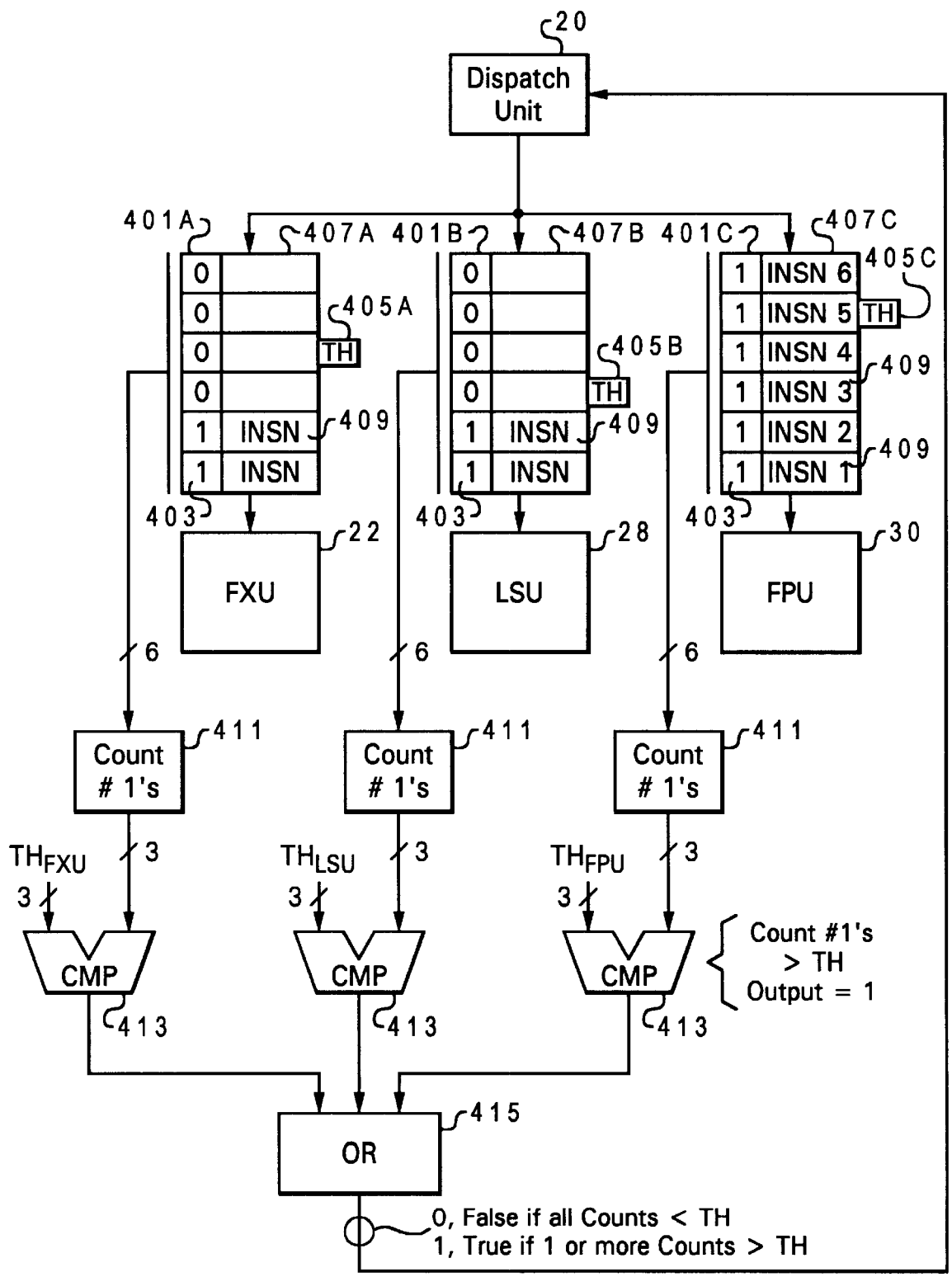
FIG. 4A is a block diagram of the circuit components utilized within one embodiment of the present invention.
Figure 4B:
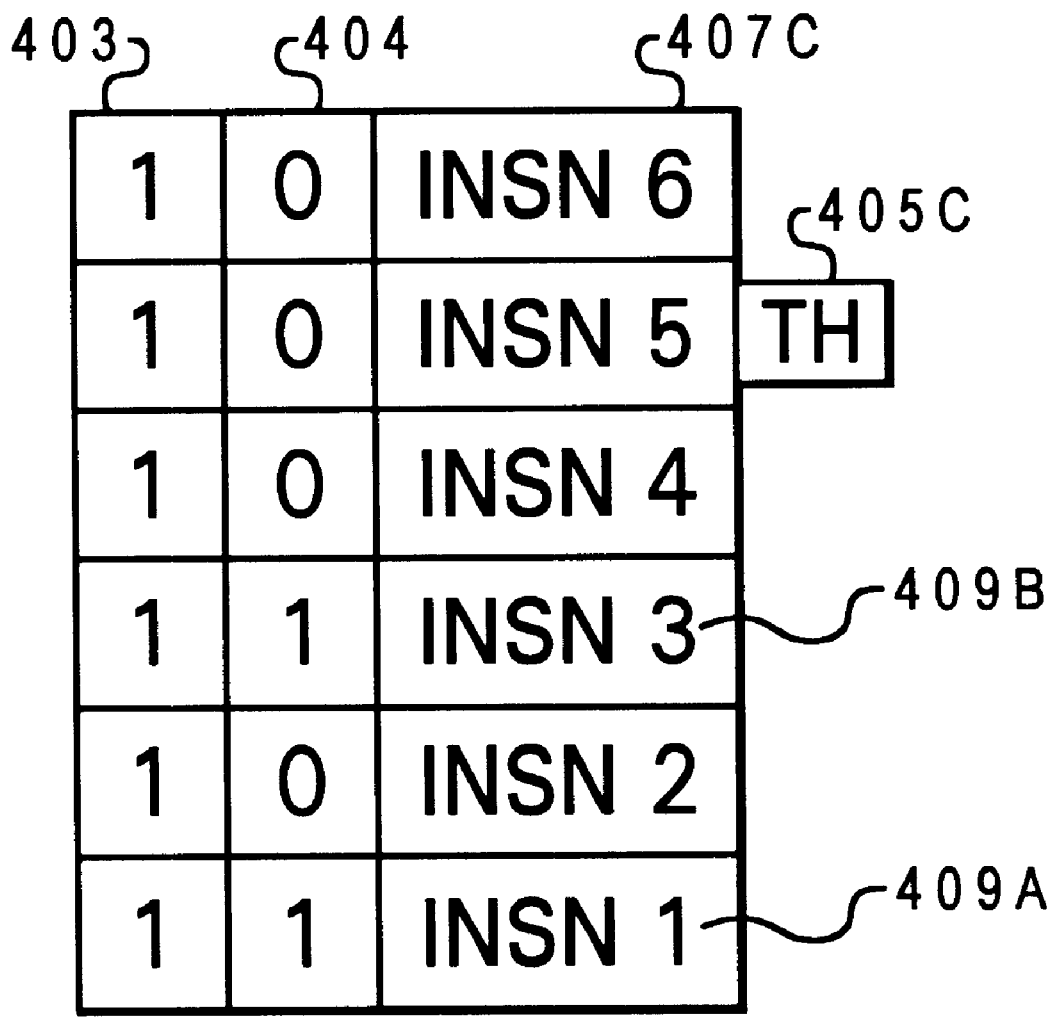
FIG. 4B is a block diagram depicting an instruction queue and register in accordance with one embodiment of the present invention.

FIG. 4A depicts the execution units FXU 22, LSU 28 and FPU 30 and their corresponding register 401A, 401B, and 401C and queue 407A, 407B, and 407C. Typically, each register 401A, 401B, and 401C allocates a valid bit 403 associated with each entry/instruction queued to the execution unit FXU 22, LSU 28, and FPU 30 in its respective queue 407A, 407B, and 407C. This bit 403 when "on" (set to "1") indicates that an instruction is present and is traditionally utilized to give prominence to that instruction within queue 401A, 401B, and 401C. Threshold value 405A, 405B, and 405C for execution unit FXU 22, LSU 28, and FPU 30 is also illustrated in FIG. 4A. As illustrated each unit may have a unique threshold value 405A, 405B, and 405C. In the preferred embodiment, the tracking of the number of instructions in each queue is implemented by counting the number of bits 403 in register 401A, 401B, and 401C. Bits 401 are counted by counter 411 which is connected to register 401A, 401B, and 401C. After an instruction has been executed the corresponding bit is reset (set to '0') reducing the number count for that queue in the preferred embodiment. Thus registers 401A, 401B, and 401C are utilized to keep track of the number of instructions in each queue 407A, 407B, and 407C of each execution unit FXU 22, LSU 28, and FPU 30 respectively. For the purposes of this illustrative embodiment, it is assumed that instructions are loaded sequentially into the queue of the execution units. Those skilled in the art understand that this representation does not preclude other representations and further that the instructions are not limited to being executed in the sequential manner as illustrated. It is further understood by those skilled in the art that alternative ways of tracking the number of instructions in an execution unit's queue are contemplated as falling within the scope of the present invention. Utilization of the registers as presented here is solely for illustrative purposes, and is not exclusive.

Dispatch unit 20 is also programmed to dispatch speculative instructions based on given conditions supplied to it from OR circuit 415 which is connected to comparator 413. Comparator 413 is provided with the threshold values for each execution unit FXU 22, LSU 28 and FPU 30. In the preferred embodiment, when dispatch unit 20 receives a speculative branch instruction (determined during the decoding stage), it first checks the system load to determine whether or not to send the branch instruction. In the preferred embodiment, comparator 413 compares each execution unit load level (number of instructions awaiting execution) to its threshold value. The results of these comparisons are then ORed together by OR circuit 415 to yield a "false," output when all of the units are below their threshold. If any one or more unit is above its threshold, then a "true" output is yielded. In the preferred embodiment, dispatch unit 20 will only dispatch a speculative branch instruction when the results of the OR function is false. Comparisons are made at the beginning of each cycle, while a speculative branch instruction is present. When the result is true, the speculative branch instruction is held until a false result is obtained. A false result may thus be obtained in the next cycle or in subsequent cycles. Those skilled in the art are familiar with the functioning of an OR circuit.

FIG. 4A illustrates one embodiment of how the checking stage of the invention is implemented. Threshold value 405A, 405B, and 405C for each unit FXU 22, LSU 28 and FPU 30, is represented on its corresponding queue 407A, 407B and 407C. The number of instructions in a given queue is determined by checking bits 403 of register 401A, 401B, and 401C. In the illustrative embodiment, FXU 22 has less instructions in its queue 407A than its threshold value 405A. Load/Store Unit 28 also has less instructions in its queue 407B than its threshold value 405B. A comparison by comparator 413 yields a false result for both units. FPU 30 has more instructions than its threshold value 405C and yields a true result when a comparison is done by comparator 413. ORing these results together thus yields a true result and the speculative branch instruction is not dispatched.

In another embodiment of the invention, only the number of speculative instructions found within any one queue is tracked. This yields a more realistic picture of how speculative the branch instruction may be. Further, the threshold value is set as a predetermined number of such speculative instructions found in the queue. When a speculative branch instruction is presented, the comparison is made based on these two values. Thus in FIG. 4B, although FPU 30 has more total instructions 409 than the threshold value, only the instructions which are themselves speculative are counted. Instruction 1 409A and Instruction 3 409B are speculative. Comparator 413 checks this number of speculative instructions (2) against threshold value 405C. Identifying speculative instructions in this embodiment entails keeping track of the instruction when it is dispatched from dispatch unit. In this embodiment, register 401C is provided with an additional bit 404 for tracking whether or not an instruction is speculative.

The preferred embodiment of the invention is implemented on a general system level and determines the dispatching of speculative branches. Another embodiment of the invention is implemented on an individual execution unit level and determines the dispatching of a speculative instruction which targets a specific execution unit. Dispatch unit 20 checks the target execution unit's register to determine the number of instructions present in the unit's queue. Comparator 413 then compares this value with the corresponding threshold value. As in the preferred embodiment of the invention, when the threshold value is equal to or below the number of instructions in the unit's queue, dispatch unit 20 holds the speculative instruction until the next cycle or subsequent cycles. If the number of instructions in the unit's queue falls below the threshold value, dispatch unit 20 dispatches the speculative instruction to the execution units to await execution.

Those skilled in the art understand that although specific methods have been disclosed of determining the threshold value of an execution unit, the threshold value is in fact an arbitrary value which may be selected in a variety of ways. The invention as described contemplates all such selection methods.

During the execution stage, execution units FXU 22, LSU 28 and FPU 30 execute instructions received from dispatch unit 20 as soon as the source operands for the indicated operations are available. After execution has terminated, execution units FXU 22, LSU 28, and FPU 30 store data results within either GPR rename buffers 33 or FPR rename buffers 37, depending upon the instruction type. Then, execution units FXU 22, LSU 28, and FPU 30 signal completion unit 40 that the execution unit has finished an instruction. Finally, instructions are completed in program order by transferring result data from GPR rename buffers 33 or FPR rename buffers 37 to GPRs 32 or FPRs 36, respectively.

The execution of instructions prior to the final possible definition of all conditions effecting execution is called speculative execution. To wait for the outcome of conditional branches, or the arrival of all possible interrupts, would make full concurrent processing impossible.

The present invention provides a novel method to disable speculative execution when resources are busy. In the preferred embodiment, this is achieved by allowing branch guessing only when it is likely that processor units will benefit from the speculation. More specifically, in the preferred embodiment, the dispatch of a speculative branch path is dependant on a measure of current utilization of the execution units. In general, if there are instructions executing and instructions queued up to be executed, then the need for additional instructions to be dispatched is less than if the execution units were waiting for work (i.e., new instructions to execute). Therefore, in the preferred embodiment of this invention, a decision to dispatch speculative instructions is based on the current utilization of the execution units. In one illustrative embodiment of the invention, the logic tracks how many instructions are queued up for each of the execution units and, based on a threshold for each execution unit, decides whether or not to dispatch speculative paths.

In the preferred embodiment of the invention, different units are assigned different threshold settings. Threshold levels are based on the unit's individual characteristics, such as, the type of instructions executed on the unit. For the purposes of this invention, a unit's threshold refers specifically to a number of instructions which are located within the unit's instruction queue awaiting execution. This number is variable depending on the system loading and the developer's choice. In the preferred embodiment, the threshold is typically a number less than the maximum number of instructions which can be stored in the unit's instruction queue. For instance, in the case of instructions which could be executed in Memory Load/Store execution units, the latency of these instructions may be large due to the nature of memory and cache management, and therefore, the threshold level for the Load/Store units is lower than for a unit that didn't have a memory latency involved in its operation.

In another embodiment of the invention, the number of instructions which had been dispatched (but not yet completed) is tracked as an indication of current execution unit utilization or as an indication of the amount of work (i.e., instructions) that was already assigned to the execution unit.

In one embodiment, the invention is implemented without pre-set threshold levels. The instructions are fetched and examined in the predicted path to identify which execution unit(s) would be the target for execution of these instructions and then, based on how many instructions were queued up (to these units). When the target unit had instructions queued up, then speculative instructions wouldn't be dispatched to this unit. When the unit is idle, however, speculative instructions would be dispatched to it. Those skilled in the art understand that the setting of a threshold value, though disclosed as the preferred embodiment, is not essential to the working of the present invention when implemented as described above.

The invention is preferably implemented in hardware and may be illustrated in terms of internal circuitry of a processor for enabling speculative branch dispatching as in FIG. 4A. In this embodiment, counter 411 tracks the number of instructions waiting to be executed in each execution unit. Comparator 413 indicates when the number of instructions waiting to be executed exceeds a predetermined threshold. Also, OR circuit 415 then compares a plurality of comparison results to determine system loading. These circuit components are additional components coupled to each other and the existing components of a processor, namely dispatch unit 20, instruction queue 407, and register 401 to enable speculative dispatching only when a number of instructions waiting for execution is less than a is predetermined threshold.

The above embodiment consists of new circuitry components. Another embodiment of the invention utilizes current hardware components. The dispatching circuitry for example, currently has a large list of conditions which are checked prior to dispatching of an instruction. Adding additional conditions to implement the invention requires very little effort and may be preferred in certain circumstances. Additionally, the physical components described above, namely a comparator, a counter and an OR circuit may be implemented as software blocks within the data processing system. The invention is capable of being implemented in any system/processor. In the preferred embodiment, a superscalar processor with multiple execution units capable of handling multiple numbers of instruction simultaneously, is desired.

It is understood by those skilled in the art that instructions may exist in more than one state. An instruction may be waiting to be executed or it may have already been executed and is in some stage of completeness. The present invention contemplates setting threshold values and counting the number of instructions in the queue based on predetermined factors which the developer may implement. For instance, if an instruction will take a large number of cycles before it is completed, then it would be preferred to count that instruction. If, however, that same instruction has been executed and will be completed in the current or next cycle, then it would be preferred to not count the instruction.

Figure 3:
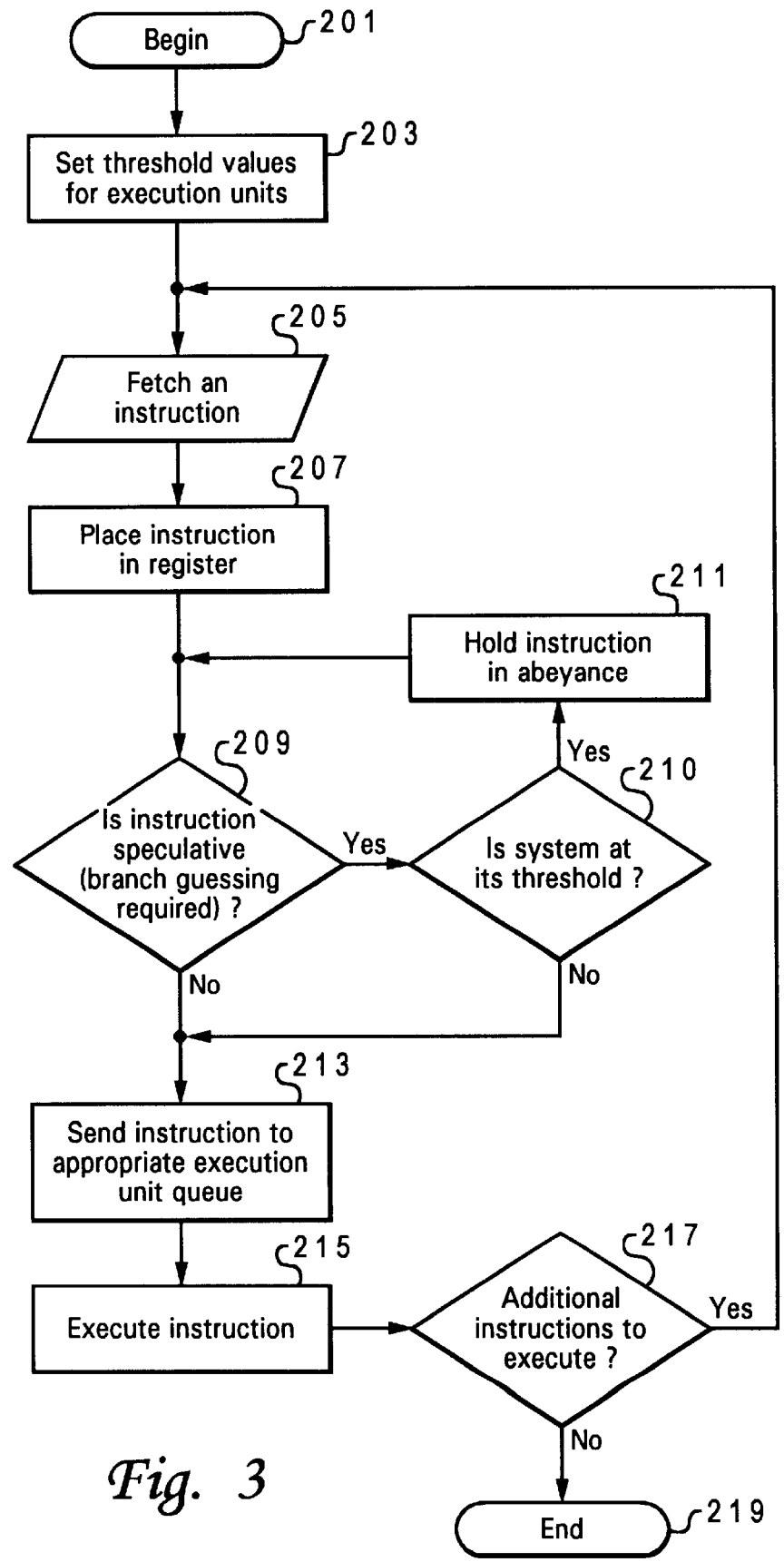
FIG. 3 is a flow chart depicting the process of instruction execution according to one implementation of the present invention.

FIG. 3 depicts a flow chart of the process involved in the implementation of the preferred embodiment of the present invention. The process begins (step 201) with the system developer setting threshold values for each execution unit (step 203). During running of an application, an instruction is fetched (step 205) by the sequential fetcher and placed into a register (step 207). The system then checks to see if the instruction is speculative, i.e. if it is a branch instruction and if branch guessing is required (step 209). When the instruction is speculative, a further check is made to determine if the execution unit queue is at its threshold level (step 210). As discussed above, there are several ways to make this determination. For example, a register attached to each execution unit is utilized to track the number of instructions queued and this number is compared against the threshold value by a comparator. If the queue is at its threshold value, the instruction is held in abeyance until some of the prior instructions in the queues are executed (step 211). This may take several cycles; however, the instruction is presented again to determine whether or not it is still speculative (step 209). If, however, the instruction queue is not at its threshold level, or when the instruction is not speculative, then it is sent to the execution unit's instruction queue (step 213) and ultimately executed (step 215). The process then checks memory for additional instructions to execute (step 217). If more instructions are available then the process returns to fetch the next instruction (step 205). Otherwise, the process ends (step 219). It is understood by those skilled in the art that although the above example has been shown with reference to single individual instructions, any number of instructions may be fetched from memory and processed simultaneously depending on hardware capabilities.

While the invention has been particularly shown and described with reference to a preferred embodiment, it will be understood by those skilled in the art that various changes in form and detail may be made therein without departing from the spirit and scope of the invention.

What is claimed is:

1. A method for dispatching of instructions in a data processing system comprising the steps of:

determining a current utilization measure for one or more execution units in said data processing system, wherein said current utilization measure is a number of instructions queued at said one or more execution units;

setting a threshold value for each execution unit, wherein an individual threshold is established for each execution unit, wherein said threshold value is selected based on characteristics of each of said plurality of execution units, and said threshold value is a number corresponding to the maximum desired number of instructions queued at said execution unit above which no speculative dispatch occurs;

comparing said number of instructions queued at each of said execution units with said threshold value of each of said execution units, respectively, to produce a series of results, and ORing said series of results, wherein said ORing yields a false output when no execution unit is at its threshold, and a true output when any one of said plurality of execution units is at its threshold; and dispatching a speculative branch instruction to a selected execution unit only when said ORing step yields said false output indicating that said current utilization measure is less than said predetermined threshold value.

2. The method of claim 1, wherein said determining step is implemented by tracking said number of instructions which have been dispatched, but not yet completed, as an indication of current execution utilization.

3. The method of claim 1, wherein said determining step is implemented by tracking said number of instructions which have been dispatched, but not yet executed, as an indication of the amount of work that has already been assigned to said execution unit.

4. The method of claim 1, wherein said dispatching step further includes:

first fetching an instruction;

examining said instruction in a predicted path to identify which execution unit is a target for execution of said instruction;

examining said instruction unit to determine the number of instructions queued up to said unit;

when said instruction unit has instructions queued up, disabling speculative instruction dispatching to said unit; and when said instruction unit is idle, enabling the dispatch of speculative instructions to said unit.

5. A data processing system for dispatching of instructions comprising:

means for determining a current utilization measure for one or more execution units in said data processing system determining a current utilization measure for one or more execution units in said data processing system, wherein said current utilization measure is a number of instructions queued at said one or more execution units;

means for setting a threshold value for each execution unit, wherein an individual threshold is established for each execution unit, wherein said threshold value is selected based on characteristics of each of said plurality of execution units, and said threshold value is a number corresponding to the maximum desired number of instructions queued at said execution unit above which no speculative dispatch occurs;

means for comparing said number of instructions queued at each of said execution units with said threshold value of each of said execution units, respectively, to produce a series of results, and ORing said series of results, wherein said ORing yields a false output when no execution unit is at its threshold, and a true output when any one of said plurality of execution units is at its threshold; and means for dispatching a speculative branch instruction to a selected execution unit only when said ORing step yields said false output indicating that said current utilization measure is less than said predetermined threshold value.

6. The data processing system of claim 5, wherein said determining means includes means for tracking said number of instructions which have been dispatched, but not yet completed, as an indication of current execution utilization.

7. The data processing system of claim 5, wherein said determining means includes means for tracking said number of instructions which have been dispatched, but not yet executed, as an indication of the amount of work that has already been assigned to said execution unit.

8. The data processing system of claim 5, wherein said dispatching means further includes:

means for first fetching an instruction;

means for examining said instruction in a predicted path to identify which execution unit is a target for execution of said instruction;

means for examining said instruction unit to determine the number of instructions queued up to said unit;

when said instruction unit has instructions queued up, means for disabling speculative instruction dispatching to said unit; and when said instruction unit is idle, means for enabling the dispatch of speculative instructions to said unit.

9. The data processing system of claim 5, wherein:

said determining means includes a register coupled to an instruction queue of said execution unit, said instruction queue holding instructions awaiting execution by said execution unit, and said register storing said predetermined threshold value and tracking the number of instructions in said instruction queue;

said comparing means includes a comparator connected to said register via a counter, said counter for counting the number of instructions in said instruction queue, and comparator for comparing said number of instructions with said predetermined threshold value to yield a result, and further wherein when more than one execution unit is checked, said comparing means further includes a comparator for ORing said result of a first comparison with said result of a second comparison; and said dispatching means includes a dispatch unit coupled to said comparator and said instruction queue, wherein said dispatch unit receives instructions form said instruction fetcher, and when said instruction is speculative, said dispatch unit dispatches said instruction to said instruction queue of said execution unit only when said comparator yields a "false" output to said dispatch unit.

10. A data processor comprising:

one or more execution units, wherein an execution unit has an instruction queue for holding instructions awaiting execution in said execution unit;

a register coupled to said instruction queue of said execution unit, wherein said register stores a predetermined threshold value for said instruction queue and further wherein said register tracks a number of instructions in said instruction queue;

a counter connected to said register, said counter for counting a number of instructions in said instruction queue;

a comparator connected to said counter for comparing said number of instructions in said instruction queue with said predetermined threshold value to yield a result, wherein said comparator performs a comparison on more than one execution unit to yield a plurality of results, wherein further said comparator is coupled to an OR circuit which performs an ORing function on said plurality of results to yield a second result; and a dispatch unit coupled to an instruction fetcher, said comparator and said instruction queue, wherein said dispatch unit receives instructions from said instruction fetcher, and when said instruction is speculative, said dispatch unit dispatches said instruction to said instruction queue of said execution unit only when said comparator yields a particular result.

11. The data processor of claim 10, wherein said second result is either said particular result or a different result, and wherein said second result is provided to said comparator.

12. The data processor of claim 10, wherein further said register stores said predetermined threshold value.

* * * * *